(12) United States Patent  
Nigam et al.

(10) Patent No.: US 11,861,304 B2  
(45) Date of Patent: Jan. 2, 2024

(54) METHODS, APPARATUS, AND SYSTEMS TO GENERATE REGEX AND DETECT DATA SIMILARITY

(71) Applicant: McAfee, LLC, Santa Clara, CA (US)

(72) Inventors: Paras Nigam, Bangalore (IN); Dilip Kumar Gudimetla, Bangalore (IN)

(73) Assignee: McAfee, LLC, San Jose, CA (US)

( * ) Notice: Subject to any disclaimer, the term of this patent is extended or adjusted under 35 U.S.C. 154(b) by 542 days.

(21) Appl. No.: 16/452,400

(22) Filed: Jun. 25, 2019

(65) Prior Publication Data

US 2020/0364295 A1     Nov. 19, 2020

(30) Foreign Application Priority Data

May 13, 2019   (IN)  .............................. 201911019039

(51) Int. Cl.
| | |
|---|---|
| *G06F 40/30* | (2020.01) |
| *G06F 40/211* | (2020.01) |
| *H04L 65/1076* | (2022.01) |
| *H04L 9/40* | (2022.01) |
| *G06F 40/242* | (2020.01) |
| *H04L 51/212* | (2022.01) |

(52) U.S. Cl.
CPC .......... *G06F 40/211* (2020.01); *G06F 40/242* (2020.01); *H04L 51/212* (2022.05); *H04L 63/1483* (2013.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS

| | | | | |
|---|---|---|---|---|
| 7,636,716 | B1 * | 12/2009 | Cheng | H04L 51/212 |
| | | | | 707/999.102 |
| 7,885,952 | B2 * | 2/2011 | Chellapilla | G06F 16/951 |
| | | | | 707/707 |
| 7,924,590 | B1 * | 4/2011 | Starovoitov | G06F 8/427 |
| | | | | 365/49.16 |
| 8,495,144 | B1 * | 7/2013 | Cheng | H04L 51/212 |
| | | | | 709/206 |
| 8,510,098 | B2 * | 8/2013 | Spears | G06F 40/40 |
| | | | | 704/270.1 |

(Continued)

OTHER PUBLICATIONS

Title={Learning to identify concise regular expressions that describe email campaigns.},author={Prasse et al.},journal={J. Mach. Learn. Res.}, vol. ={16}, No. ={1}, pp. ={3687-3720}, year={2015} (Year: 2015).*

*Primary Examiner* — Lamont M Spooner

(74) *Attorney, Agent, or Firm* — Hanley, Flight & Zimmerman, LLC

(57) ABSTRACT

Methods, apparatus, systems and articles of manufacture to generate regex and detect data similarity are disclosed. An example apparatus includes a token graph generator to generate a token graph including nodes based on a cluster of strings corresponding to a group of messages that are known to be spam; a pivot engine to identify pivot nodes in the cluster of strings; a pivot applicator to tag corresponding ones of the nodes of the token graph as the pivot nodes; and a regex converter to generate the anti-spam signature based on: (a) the tagged nodes and (b) at least one of the node of the token graph that is not tagged as a pivot node.

26 Claims, 8 Drawing Sheets

(56) References Cited

U.S. PATENT DOCUMENTS

| | | | |
|---|---|---|---|
| 9,361,198 B1* | 6/2016 | Popovici | G06F 11/30 |
| 9,565,236 B2* | 2/2017 | Harz | H04L 67/02 |
| 10,009,358 B1* | 6/2018 | Xie | G06F 21/552 |
| 10,936,687 B1* | 3/2021 | Paiz | G06F 16/3341 |
| 11,201,855 B1* | 12/2021 | Kondamuri | H04L 63/0263 |
| 2007/0011347 A1* | 1/2007 | George | G06Q 10/107 |
| | | | 709/235 |
| 2008/0270833 A1* | 10/2008 | McMillen | H04L 63/1408 |
| | | | 714/E11.177 |
| 2009/0265786 A1* | 10/2009 | Xie | H04L 63/1441 |
| | | | 726/24 |
| 2009/0285474 A1* | 11/2009 | Berteau | H04L 51/212 |
| | | | 382/159 |
| 2010/0094887 A1* | 4/2010 | Ye | H04L 51/212 |
| | | | 707/E17.014 |
| 2010/0145900 A1* | 6/2010 | Zheng | H04L 51/212 |
| | | | 709/206 |
| 2010/0325633 A1* | 12/2010 | Eguro | G06F 9/4881 |
| | | | 718/103 |
| 2011/0283360 A1* | 11/2011 | Abadi | H04L 63/1416 |
| | | | 726/24 |
| 2012/0124064 A1* | 5/2012 | Syrowitz | G06F 16/90344 |
| | | | 707/E17.069 |
| 2012/0215853 A1* | 8/2012 | Sundaram | H04L 51/212 |
| | | | 709/206 |
| 2014/0298039 A1* | 10/2014 | Pandya | G06F 3/0638 |
| | | | 713/190 |
| 2015/0169511 A1* | 6/2015 | Chen | G06F 40/154 |
| | | | 715/234 |
| 2015/0200955 A1* | 7/2015 | Martin | H04L 63/0263 |
| | | | 726/23 |
| 2017/0149804 A1* | 5/2017 | Kolbitsch | H04L 63/1416 |
| 2017/0221084 A1* | 8/2017 | Thirugnanasundaram | |
| | | | G06Q 10/107 |
| 2018/0034778 A1* | 2/2018 | Ahuja | H04L 63/1416 |
| 2018/0034779 A1* | 2/2018 | Ahuja | H04L 63/0236 |
| 2018/0082062 A1* | 3/2018 | Hager | H04L 63/1416 |
| 2018/0121026 A1* | 5/2018 | Nadig | G06F 40/205 |
| 2018/0321921 A1* | 11/2018 | Venkata | G06F 16/332 |
| 2018/0350144 A1* | 12/2018 | Rathod | G06Q 20/3224 |
| 2019/0087428 A1* | 3/2019 | Crudele | G06F 40/279 |
| 2020/0007502 A1* | 1/2020 | Everton | H04L 51/063 |
| 2020/0067861 A1* | 2/2020 | Leddy | G06F 21/6245 |
| 2020/0279225 A1* | 9/2020 | Li | H04W 12/128 |
| 2020/0314120 A1* | 10/2020 | Dedenok | H04L 51/18 |

* cited by examiner

METHODS, APPARATUS, AND SYSTEMS TO GENERATE REGEX AND DETECT DATA SIMILARITY

FIELD OF THE DISCLOSURE

This disclosure relates generally to spam protection, and, more particularly, to methods and apparatus to generate regex and detect data similarity.

BACKGROUND

Electronic communication devices utilize electronic messaging platforms (e.g., E-mail, text, messengers, etc.) to allow users to communicate with each other via a network (e.g., the Internet). Spam messages are unsolicited messages sent in bulk through the electronic messaging platforms. Spam messages may or may not be harmful (e.g., may be junk) to the end user. Some spam messages include attachments and/or links to cause the recipient to download malicious software (e.g., malware and/or a virus). Even when spam messages are not malicious, spam messages may be annoying or undesirable to a user.

BRIEF DESCRIPTION OF THE DRAWINGS

The figures are not to scale. In general, the same reference numbers will be used throughout the drawing(s) and accompanying written description to refer to the same or like parts.

Figure 1:
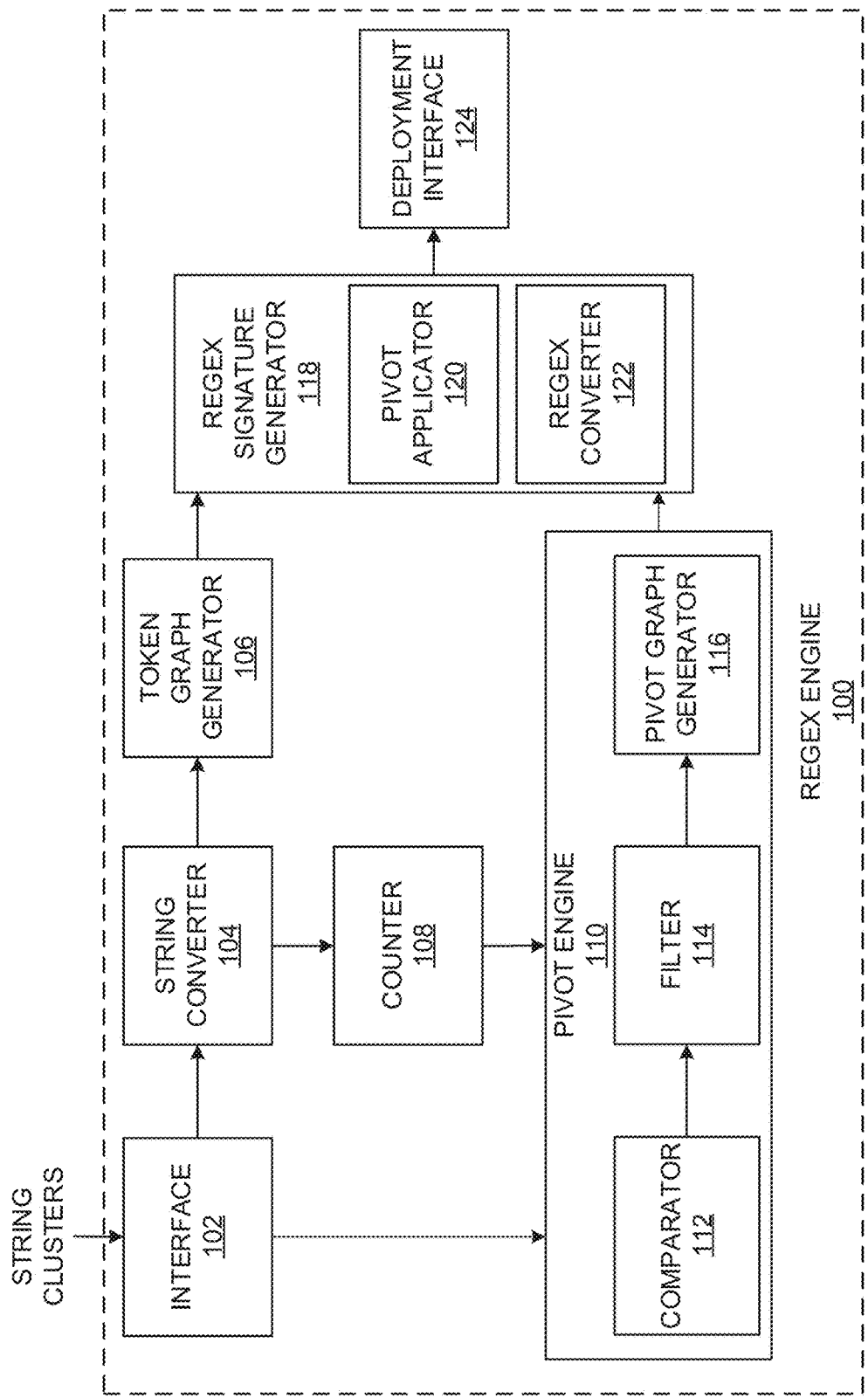
FIG. 1 is a block diagram of an example implementation of an example regex engine.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

As used herein, a regular expression (also referred to as a regex) is defined to be a text string corresponding to a pattern of text and/or other data. Regular expressions are useful in programming methods for pattern matching. For example the regular expression of "\$\d" identifies a string of text that has a $ before a digit (e.g., 0-9). As used herein, a string of text, sometimes referred to as "a string" is any ordered series of alphanumeric characters. Regular expressions may be used as a signature in anti-spam engines. For example, known spam messages (emails, texts, char interface(s), etc. that have been marked, tagged, and/or identified as spam messages by a user, processor, and/or other device) and/or parts of spam messages (e.g., the title, subject, body, uniform resource locator (URL), title of attachments, etc.) may be analyzed to determine patterns exhibited by such spam messages. In such an example, one or more regular expression(s) corresponding to the patterns can be combined to generate a signature that identifies the patterns in subsequent messages to determine whether the subsequent messages should be tagged as spam. As used herein, a signature, anti-spam signature, regular expression signature, and/or regex signature have the same meaning and are defined to include one or more regular expressions that may be used to identify spam. The signature, anti-spam signature, regular expression signature, and/or regex signature may be generated by analyzing known and/or suspected spam and/or malicious emails. The generated signatures can be transmitted and/or released to devices periodically, aperiodically, and/or based on a trigger to enable the devices to filter out spam messages.

Prior regex signature generation techniques require team(s) of researchers to analyze many (e.g., millions of) messages per day. In such prior techniques, the team(s) of researchers attempt to find group(s) of messages (e.g., tagged messages that are similar) and to generate a signature corresponding to one or more regular expressions based on pattern(s) found in a given group. However, human-based signature generation is prone to error, is manually intensive, expensive, and slow. Accordingly, humans may not be able to generate signatures based on a large number (e.g., hundreds, thousands and/or millions) of messages in a timely fashion. In other regex signature generation technique, tools have been implemented to generate anti-spam signatures. However, such tools are slow and are limited in the number of strings that can be analyzed. For example, such tools can take over eight minutes to generate a signature based on two strings. Additionally, such tools can only analyze a maximum of fifteen strings at a time before crashing. Examples disclosed herein can generate an accurate anti-spam signature based on thousands of strings within seconds.

Examples disclosed herein generate an anti-spam signature by generating a token graph representative of different combinations of ordered sub-strings of messages of interest. As used herein, a sub-string is any portion (less than all) of a string. A token graph includes nodes representative of the sub-strings of the messages. A sub-string of a string is referred to herein as a token. Examples disclosed herein identify pivots or pivot nodes of the token graph from messages which have been grouped based on similarity. The messages may be grouped before processing based on various criteria such as length, common sub-strings, format, etc. Grouping the messages prior to building the token graph leads to better results. For example, a token graph may be generated for each group of similar message identified as spam. In some examples, a device (e.g., a processor) groups known spam messages (e.g., messages that have been marked, tagged, and/or identified as spam messages by a user, processor, and/or other device) based on the various criteria prior to the generation of the token graph. As used herein, pivots represent the most common substrings (e.g., substrings occurring at more than a threshold frequency) included in the grouped messages. The "most common" substring are application specific. For example, they may occur in more than X % of the messages. For example, if 1,000 emails in a group all start with "Hello there," "Hello," "there," and/or "Hello there" may be defined as pivot(s). Examples disclosed herein generate an anti-spam signature based on the token graph and identified pivots for a corresponding group of messages. For example, individual pivots of the token graph are respectively converted into corresponding single regular expressions (a single regex). Multiple non-pivots (e.g., substrings that do not occur more than the threshold number of times in the group of messages) between two pivots are merged and converted into a single regular expression (e.g., a single, merged regex). Accordingly, the resulting anti-spam signatures include the regular expressions for pivots representative of the most common substrings of the group of messages, and may be interleaved with regular expressions for the random context surrounding the pivots (e.g., the non-pivots). Such anti-spam signatures represents 90% or more of the corresponding group of messages. Using examples disclosed herein an accurate anti-spam signature can be generated based on analysis of thousands of strings within seconds (e.g., in less than one minute).

FIG. 1 is a block diagram of an example implementation of an example regex engine 100 to automatically generate and/or deploy an anti-spam signature corresponding to a group of messages. In the example of FIG. 1, the example regex engine 100 includes an example interface 102, an example string converter 104, an example token graph generator 106, an example counter 108, an example pivot engine 110, an example regex signature generator 118, and an example deployment interface 124. The example pivot engine 110 includes an example comparator 112, an example filter 114, and an example pivot graph generator 116. The example regex signature generator 118 includes an example pivot applicator 120 and an example regex converter 122.

The example interface 102 of FIG. 1 obtains a group of messages (herein referred to as a cluster of strings or string cluster) from another device and/or component. The group of messages may be one of a plurality of groups of messages. The group may be defined using any criteria of interest. For example, the messages may be grouped based on subject, points of origin, destination, characteristics of the recipient, text, number of characters, links, tags, length of text, etc. A group of messages may include thousands of messages. Typically, the messages in the group are known to be spam messages. For example, the known messages may have been previously sent to a user device and tagged as spam by the user and/or the user device. The device and/or component processes messages to identify similar messages and to place the similar messages into groups. For example, when a user tags a message as spam, the user device may transmit the tagged message to the device and/or component and the device and/or component may then separate the tagged messages into groups of similar messages. The device and/or component transmits all the messages of a group to the example interface 102. Accordingly, the example interface 102 obtains a group of known spam messages that are similar based on a characteristic.

The example string converter 104 of FIG. 1 converts the obtained cluster of strings (sometimes referred to herein as a string cluster) into tokens (e.g., a first string is converted into one or more first tokens, a second string is converted into one or more second tokens, etc.) by performing a tokenization technique. The example string converter 104 tokenizes the cluster of strings to separate the string(s) into sub-strings (e.g., tokens). The string converter 104 may separate a string into two or more sub-strings based on any criteria such as by identifying spaces and/or special characters. For example, the string converter 104 may break the string "Is this the right-time for working" into the sub-strings (e.g., tokens) "Is" "this" "the" "right" "time" "for" and "working" because each of these words is separated from adjacent words by a space or a special character (e.g., "-", a dash).

The example token graph generator 106 of FIG. 1 generates a token graph corresponding to the string cluster. The token graph includes a node for the unique token(s) at each position of the string cluster. For example, the first node(s) at the first position of the graph corresponds to the first unique word(s) used in the first position of the string cluster, the second node(s) at the second position of the graph corresponds to the second unique word(s) used in the second position of the string of cluster, etc. For example, for a string cluster including "Welcome to . . . " and "Welcome everyone . . . ", the token graph generator 106 generates a first node at a first position for the substring "Welcome" and second nodes at a second position for the substrings "to" and "everyone." An example of a token graph that may be generated by the example token graph generator 106 based on a cluster of strings is further described below in conjunction with the example token graph 204 of FIGS. 2A-2B. The token graph generator 106 provides the generated token graph to the regex signature generator 118 to generate a regex signature, as further described below.

The example counter 108 of FIG. 1 generates a word bag count by generating a count of each unique token in the string cluster being processed. For example, if the word "Hello" appears 1,000 times in the string cluster, the counter 108 will, based on the tokenization of the string cluster, count the 1,000 "Hello" occurrences and tag the 1,000 count to the "Hello" token. As used herein, a word bag count corresponds to a set of unique tokens tagged with their respective counts. The example counter 108 provides the word bag count (e.g., the tokens tagged with the corresponding counts representative of how many times the tokens appear in the cluster of strings) to the example pivot engine 110. The word bag count may be, for example a two column array. A first column of the array may be populated by the token. A second column of the array may be populated with corresponding counts for the respective tokens. The counts and their corresponding tokens may be mapped to one another by being in the same row of the array.

The example pivot engine 110 of FIG. 1 utilizes the word bag count and the string cluster to generate a pivot graph. The pivot engine 110 of FIG. 1 includes the example comparator 112, the example filter 114, and the example pivot graph generator 116. The pivot graph identifies particular tokens as pivots (e.g., pivot tokens). The example pivot engine 110 selects a token to be a pivot when a token appears more than a threshold number of times in the cluster of strings (e.g., the token is tagged with a count over the threshold number). In contrast, a non-pivot token is a token that occurs less than the threshold number of times (e.g., the token is tagged with a count below the threshold number). Alternatively to comparing to a specific threshold, pivots may instead correspond to the X (e.g., 20) most frequently occurring tokens in the cluster of strings. X may be is based on user and/or manufacture preferences. X may be any number based on the circumstances or application.

The pivot engine 110 of FIG. 1 orders the pivots to correspond to the most common order in which the pivots occur in the cluster by identifying where the pivots occur within the cluster of strings. Accordingly, the example pivot engine 110 generates a pivot or association that identifies which tokens are pivots and an order corresponding to where the pivots occur most frequently within the cluster of strings. The pivot association may be represented by any data structure. In the illustrated example, the association is represented by a pivot graph or a pivot map.

To identify the pivots, the comparator 112 of the pivot engine 110 of FIG. 1 compares the counts of tokens (e.g., using the word bag count) to a threshold. The threshold may be based on user and/or manufacturer preferences. In some examples, the comparator 112 may compare the counts of the tokens to each other. For example, the comparator 112 may sort the counts in the word bag count to identify the top X number of tokens based on the respective counts, where X is based on user and/or manufacturer preferences and/or is based on the characteristics of the cluster of strings. X may be dependent on the data being processed. For example, the comparator 112 may identify (A) the top two most frequently occurring tokens when the cluster of strings includes less than ten substrings (e.g., X=2), (B) the top three most frequently occurring tokens when the cluster of strings include between ten and twenty substrings (e.g., X=3), etc. The comparator 112 outputs the result of the comparisons to the example filter 114.

The example filter 114 of the pivot engine 110 of FIG. 1 selects pivots (e.g., pivot tokens) of the string cluster based on the output of the comparator 112. For example, the filter 114 filters out (e.g., removes) any tokens with counts that do not satisfy the above-threshold. Accordingly, the tokens remaining after filtering correspond to the tokens which are most common in the string cluster. In some examples, the filter 114 may additionally filter out pivot(s) whose length(s) is/are below a threshold. For example, smaller words (e.g., words of three letters or less) may not be accurate indicators of spam when used as a pivot. Accordingly, the example filter 114 may filter out such smaller words (e.g., when the length of the token doesn't satisfy a threshold) to remove such words from the group of pivots. The threshold length may be application specific and/or based on user and/or manufacturer preferences. In some examples, the filter 114 may filter out the tokens (e.g., tokenized substrings) with lengths below a threshold prior to the comparator 112 comparing the tokens to the threshold.

The example pivot graph generator 116 of FIG. 1 generates a pivot graph based on the pivots identified by the example comparator 112 and the example filter 114. The pivot graph reflects the identified pivots in the order in which they most commonly occur in the cluster of strings. For example, assume the comparator 112 and filter 114 identify a first word, "A," a second word, "B,", and a third word, "C," as pivots of the string cluster of interest. In such an example, if B follows A and C follows B in most instances of the strings in the string cluster, the pivot graph generator 116 generates a pivot graph with the token arranged in the order A-B-C, where A is first in the graph, B is second in the graph, and C is third in the graph. In another example, the example pivot graph generator 116 may generate an association by tagging A as a first pivot, tagging B as a second pivot, and tagging C as a third pivot. An example of a pivot graph that may be generated by the example pivot graph generator 116 is further described below in conjunction with the example pivot graph 206 of FIGS. 2A-2B. The pivot graph generator 116 transmits the pivot graph to the example regex signature generator 118.

The example regex signature generator 118 of FIG. 1 generates a regex signature corresponding to the string cluster based on the token graph generated by the token graph generator 106 and the pivot graph generated by the pivot engine 110. For example, the regex signature generator 118 tags nodes of the token graph as pivot nodes based on specified pivot tokens of the pivot graph to generate a tagged token graph. The regex signature generator 118 leaves the non-pivot nodes as untagged nodes in the tagged token graph. As used herein, tagged nodes are pivot nodes of the token graph. As used herein, untagged nodes are nodes of the token graph that are not pivot nodes. An example of a tagged token graph is described below in conjunction with the example token graph 207 of FIGS. 2A-2B. The regex signature generator 118 converts multiple untagged nodes (e.g., non-pivot nodes) of the tagged token graph that are before a first pivot node, after a last pivot node, and/or between any two pivot nodes into single (e.g., a merged or combined) expression representing two or more non-pivots) regex expression(s). The regex signature generator 118 additionally converts the each of pivot node(s) into a respective (e.g., one) regex expression. In response to converting the pivot (e.g., tagged nodes) and non-pivots (e.g., untagged nodes) into regex expressions, the regex signature generator 118 generates a regex signature including the generated regex expressions. An example of a regex signature is described below in conjunction with the example regex signature 208 of FIGS. 2A-2B. In some examples, the regex signature may be a data string that a processor may be programmed to match against a target message to determine if it is spam and/or may be an executable that may be executed by a processor to identify spam by finding messages that matches the characteristics of the cluster of strings (e.g., a search pattern for messages that match the characteristics of the cluster of strings). In other examples, the regex expression is data that is used or, for example, an argument in performing comparison to attempt to identify spam messages.

Initially, the example pivot applicator 120 of the example regex signature generator 118 of FIG. 1 identifies pivots specified in the pivot graph and tags nodes of the token graph corresponding to the identified pivots based on the order of the pivot graph. For example, the pivot applicator 120 traverses through the positions of the token graph until a node corresponding to the first pivot is found and tags the node of the token graph as a pivot or a pivot node (e.g., by applying metadata to the node). After tagging the first pivot, the pivot applicator 120 continues to traverse through the positions of the token graph until a second node corresponding to the second pivot is found and tags the second node of the token graph as a second pivot. This process may continue until the pivot applicator 120 has tagged the remaining pivots in the token graph as pivot nodes, resulting in a tagged pivot graph, as further described below in conjunction with FIGS. 2A-2B.

Once the nodes of the token graph have been processed (e.g., tagged or left untagged), the example regex converter 122 of the example regex signature generator 118 of FIG. 1 generates a regex signature based on the tagged token graph. For example, the regex converter 122 merges each tagged pivot node of the tagged token graph to a single regex expression and converts the multiple untagged nodes (e.g., the nodes of the tagged token graph that have not been tagged as pivots) positioned between two pivot nodes into a single, merged regular expression. Additionally, if there are non-pivot node(s) (e.g., untagged nodes preceding a first pivot, between pivot nodes, or following a last pivot), the example regex converter 122 respectively converts the groups of non-pivot node(s) (e.g., untagged nodes of the tagged token graph) into corresponding single, merged regex expression(s). A group of non-pivots nodes (e.g., multiple untagged nodes of the tagged token graph) is any of: (A) non-pivot nodes between two pivot nodes; (b) non-pivot nodes preceding the first pivot node, or (c) non-pivot nodes after the last pivot node. For example, if a tagged token graph includes non-pivots "A" and "B" followed by pivot "X" followed by non-pivots "C" and "D" followed by pivot "Y" the regex converter 122 converts "A" and "B" into a single regex expression (e.g., {\A\B}), "X" into a single regex expression (e.g., X), "C" and "D" into a single specific regex expression (e.g., {\C\D}) and "Y" into a single regex expression (e.g., Y) to generate the regex signature "({\A\B})(X)({\C\D})(Y)". In this expression "\" indicates that one of the strings that may be found to satisfy a search and "{ }" groups the all the possible strings that may be found to satisfy the search. As described above, the regex signature may be a data string that a processor may be programmed to match against a target message to determine if it is spam (e.g., messages that start with a first string A or B followed by a second string X followed by a third string C or D, followed by a fourth string Y). Alternatively, if there are more than a threshold number of pivots between the two pivots, the example regex converter 122 may convert the pivots into a generic regex based on the length of the strings, as further described below in conjunction with FIGS. 2A-2B. A generic regex does not cause a processor to look for the exact non-pivot string, but for a string that has a similar length as the non-pivot string. If the regex converter 122 generates a regex expression corresponding to the cluster of strings that corresponds to known spam, a processor can utilize the regex expression to find one or more messages that match the cluster and tag such message(s) as potential spam. Because, by definition created by the threshold test above, non-pivot nodes occur less often in the string cluster than pivot nodes, non-pivots correspond to some degree of randomness in the string cluster. Accordingly, by representing non-pivot nodes with a single, compound regex expression, the regex converter 122 generates a regex signature focused on the pivots and accounts for randomization between different pivots. For example, the creator of a spam message may attempt to create messages that have been slightly adjusted to avoid being filtered. Accordingly, although the spam messages created may be very similar, the creator may create four different spam messages with the first word being different (e.g., the first word being one of "A" "B" "C" or "D") and the rest of the words being the same. The regex converter 122 may generate a regex signature based on the four messages focused on the pivots (e.g., the words of the spam messages that are the same) and accounting for the randomization of the first word among the four messages by generating a single regex of {\A\B\C\D} at a first position of a signature. In this manner, any message that includes any one of "A" "B" "C" or "D" in the first position of the message followed by the pivots can be identified as spam. As such, the regex signature corresponds to a larger percentage of the strings in the cluster.

Figure 2A:
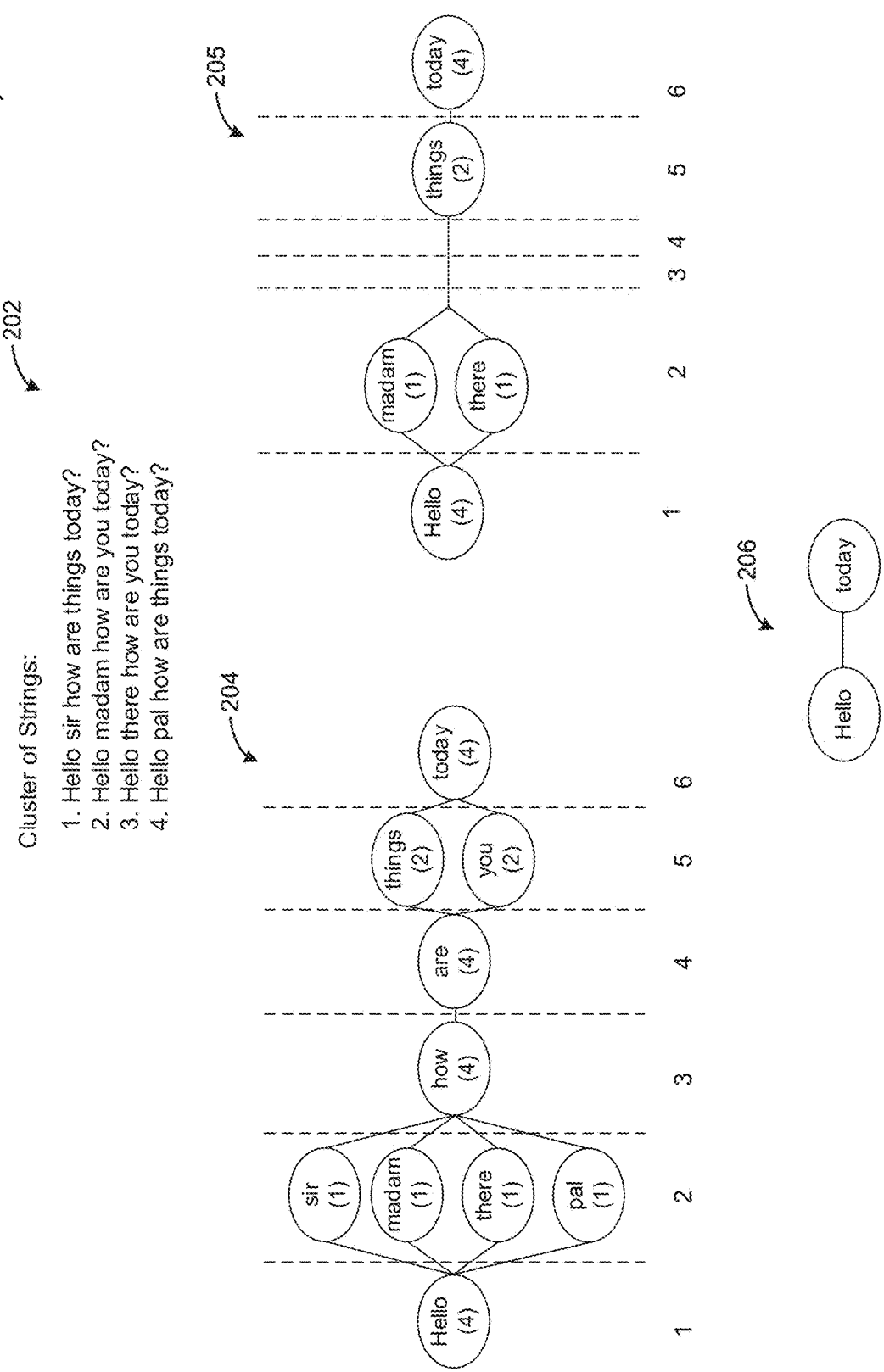
FIGS. 2A-2B illustrate an example regex signature generation performed by the regex engine of FIG. 1.
Figure 2B:
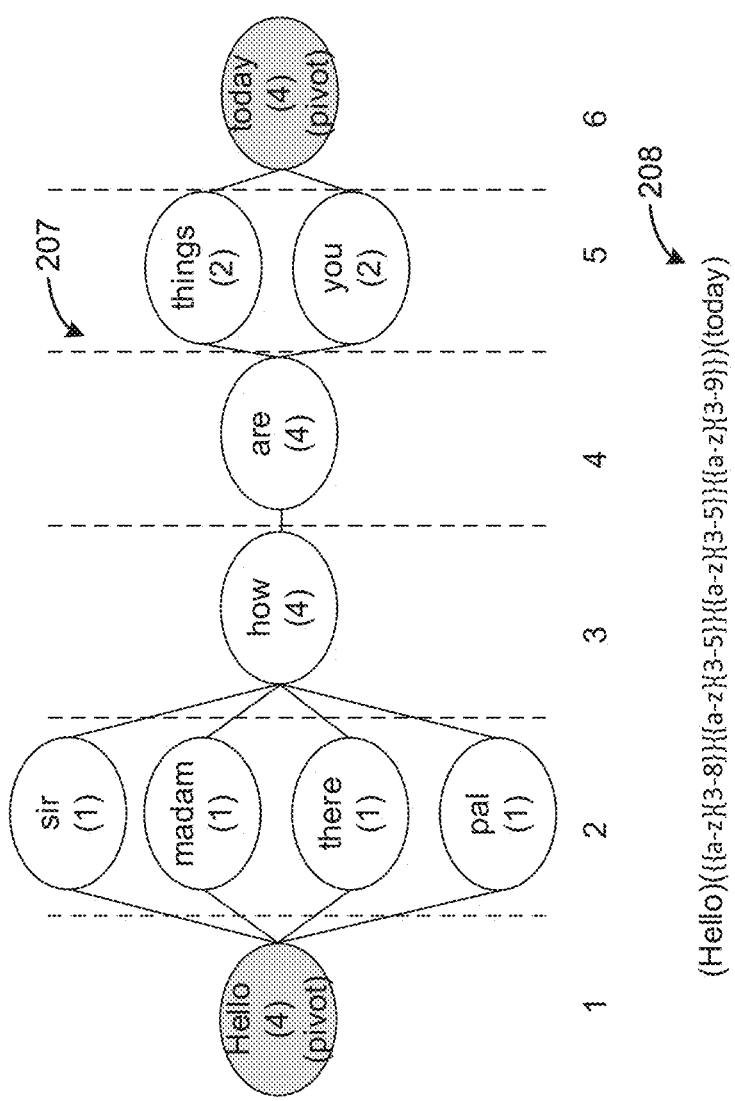

The example deployment interface 124 of FIG. 1 deploys generated regex signatures to devices. For example, the deployment interface 124 can be transmitted to a device of an end user (e.g., via a network, such as the Internet) in response to a user initiated request of a spam filtering software, part of a software update, and/or to a storage unit so that a package of regex signatures can later be generated. Additionally or alternatively, the deployment interface 124 may deploy the generated regex signatures to a server or other device. In this manner, the server or other device may utilize the regex signatures to filter out spam messages before being transmitted to a user device. In some examples, the deployment interface 124 deploys regex signatures in response to a new regex signature being generated. In some examples, the deployment interface 124 transmits a group of regex signatures for multiple different string clusters at a set period of time (e.g., hourly, daily, weekly, etc.), based on a trigger (e.g., a request from a device), and/or after a threshold number of regex signatures have been created. As described above, the regex signatures may be used by the processors to identify spam by identifying messages that include a pattern of alphanumeric text corresponding to one or more of the regex signatures. Accordingly, transmitting the regex signatures to devices enable those devices to block spam reduce (e.g., eliminate) these potential vehicles for transferring malware that can damage, misuse, or even destroy a computing device FIGS. 2A-2B represent an example regex signature generation process 200 performed by the example regex engine 100 of FIG. 1. The example of FIGS. 2A-2B include an example cluster of strings 202, an example token graph 204, an example pivot graph 206, an example tagged token graph 207, and an example regex signature 208.

As described above, the cluster of strings 202 are strings from different messages that have been identified as similar by another device or component. The messages may be, for example, known spam messages. Although the example of FIGS. 2A-2B includes four messages, a cluster of strings may include thousands of strings. The example string converter 104 of FIG. 1 converts the four strings of the cluster of strings 202 into tokens (e.g., sub-strings) by tokenizing the four strings based on, for example, spaces and/or special characters. For example, the string converter 104 converts "Hello sir how are things today?" to the tokens "Hello" "sir" "how" "are" "things" "today".

The token graph generator 106 (FIG. 1) converts the tokens for the strings of the cluster into the example token graph 204 of FIGS. 2A-2B. For example, the token graph generator 106 determines that the first token of each of the strings is "Hello". Accordingly, the token graph generator 106 generates a node for the "Hello" token at a first position. Subsequently, the token graph generator 106 determines the second tokens for each of the strings and generates a node for each unique token at the second position. The position are shown by dotted vertical lines in the example of FIGS. 2A-2B. As shown in the example token graph 204, the positions of respective nodes of the token graph 204 correspond to positions of respective substrings of the cluster of strings 202. For example, the substring "Hello" is in the first position of each string of the cluster of strings 202 and the respective node "Hello" is in the first position of the example token graph 204, the substrings "sir" "madam" "there" and "pal" are in the second position of each string of the cluster of strings 202 and the respective nodes "sir" "madam" "there" and "pal" are in the second position of the example token graph 204, etc. In this manner, the first order of tokens of the token graph 204 is the same as the second order of substrings in the cluster of strings 202. The example token graph generator 106 continues to convert the tokens until nodes at the respective positions until all the tokens have been implemented in a node. Accordingly, the token graph 204 represents the possible combinations of the cluster of strings 202.

The example counter 108 (FIG. 1) counts the number of occurrences of each token from the cluster of strings 202 and tags each tokens with the corresponding count. The counts are represented in the nodes of the token graph 204 of FIG. 2 by a number in parentheses. The example filter 114 (FIG. 1) filters out tokens that are below a threshold. For example, in the example regex signature generation process 200 of FIGS. 2A-2B, the threshold is three characters long. Accordingly, the example filter 114 filters out tokens that are three characters of less (e.g., "sir" "pal" "how" "are" and "you") to generate the example filtered token graph 205. Once filtered, the example comparator 112 (FIG. 1) compares the count to a threshold to identify pivots. For example, in the example regex signature generation process 200 of FIGS. 2A-2B, the threshold is three instances. Accordingly, the example comparator 112 identifies tokens that appear more than three times in the cluster of strings (e.g., in the same position or at any position, based on user and/or manufacturer preferences). Additionally or alternatively, the example comparator 112 may determine the X number of tokens with the Y highest counts. The example filter 114 filters out the tokens that do not satisfy the threshold, resulting in pivots (e.g., "Hello" and "today") of the cluster of strings 202. The example pivot graph generator 116 generates the example pivot graph 206 based on the identified pivots. Because "Hello" occurs before "today" in all of the strings of the cluster of strings 202, the example pivot graph generator 116 generates the example pivot graph 206 to include the pivot "Hello" before the pivot "today."

The example pivot applicator 120 (FIG. 1) of the regex signature generator 118 (FIG. 1) generates the example tagged token graph 207 by tagging the pivots from the pivot graph 206 in the example token graph 204 and leaving non-pivots as untagged nodes. In other examples, non-pivots may be affectively labeled as non-pivot nodes, rather than leaving as untagged. Once the pivots are tagged, the example regex converter 122 converts the pivots into single regexes and converts any non-pivots between the pivots into corresponding a single, merged regex. Accordingly, the example regex converter 122 converts pivot "Hello" to regex "Hello", converts the non-pivots "sir" "madam" "there" "pal" "how" "are" "things" and "you" between the "Hello" and "today" pivots to a single generic regex or a single specific regex, and converts pivot "Today" to regex "Today," resulting in the example regex signature 208. A specific regex corresponds to a search identifying the specific words of the pivots. For example, the example regex converter 122 converts the non-pivots "sir" "madam" "there" "pal" "how" "are" "things" and "you" between the "Hello" and "today" pivots to a single specific regex of "({\sir'\'madam'\'there'\'pal'\'how'\'are'\'things'\'you'})." In such an example, the single specific regex corresponds to a search that identifies messages that include any one of "sir" "madam" "there" "pal" "how" "are" "things" and "you" in one or more positions (e.g., between the two pivots). A generic regex corresponds to search identifying any word that has a similar length. For example, because the first four non-pivots at the second position of the example token graph 204 are words varying from 3 characters to 5 characters, the example regex converter 122 creates the first part of the regex to be {{a-z}{3-8}} which searches for any word that includes 3 to 8 letters (e.g., giving a three letter cushion from the 5 character maximum of the non-pivots in the second position). For example, the {a-z} part of the regex identifies any string with letters a-z and the {3-8} part of the regex identifies any string with a character length of 3 to 8 characters. Accordingly, the regex{{a-z}{3-8}} searches for any word that includes 3 to 8 letters. The regex converter 122 converts the non-pivot nodes into a single generic regex or a single specific regex based on the number of non-pivots in the between the two pivots. A user and/or manufacture may define a threshold number of non-pivots that define whether the regex conversion should be generic or specific. The amount of cushion added to the minimum characters and/or maximum characters may be based on user and/or manufacturer preferences. Additionally, different cushions may be added to different maximum/minimum word lengths (e.g., a cushion of 2 characters may be added to words of less than 5 characters and a cushion of 3 characters may be added to words with 5 or more characters). In the example of FIGS. 2A-2B, the number of non-pivots between the "Hello" pivot and the "today" pivot is above the threshold. Accordingly, the example regex converter 122 converts the non-pivots into the single regex "({{a-z}{3-8}}{{a-z}{3-5}}{{a-z}{3-5}}{{a-z}{3-9}})"

The example deployment interface 124 deploys the example regex signature 208 to devices. In this manner, the devices can execute a search of messages using the regex signature 208 to identify messages that start with "Hello." followed by a word with a character length between 3 and 8 characters, followed by a word with a character length between 3 and 5 characters, followed by a word with a character length between 3 and 5 characters, followed by a word with a character length between 3 and 9 characters, followed by "today."

While an example manner of implementing the example regex engine 100 is illustrated in FIG. 1, one or more of the elements, processes and/or devices illustrated in FIG. 1 may be combined, divided, re-arranged, omitted, eliminated and/or implemented in any other way. Further, the example interfaced 102, the example string converter 104, the example token graph generator 106, the example counter 108, the example pivot engine 110, the example comparator 112, the example filter 114, the example pivot graph generator 116, the example regex signature generator 118, the example pivot applicator 120, the example regex converter, and the example deployment interface 124, and/or, more generally the example regex engine 100 of FIG. 1 may be implemented by hardware, software, firmware and/or any combination of hardware, software and/or firmware. Thus, for example, any of the example interfaced 102, the example string converter 104, the example token graph generator 106, the example counter 108, the example pivot engine 110, the example comparator 112, the example filter 114, the example pivot graph generator 116, the example regex signature generator 118, the example pivot applicator 120, the example regex converter, and the example deployment interface 124, and/or, more generally the example regex engine 100 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interfaced 102, the example string converter 104, the example token graph generator 106, the example counter 108, the example pivot engine 110, the example comparator 112, the example filter 114, the example pivot graph generator 116, the example regex signature generator 118, the example pivot applicator 120, the example regex converter, and the example deployment interface 124, and/or, more generally the example regex engine 100 of FIG. 1 is and/or are hereby expressly defined to include a non-transitory computer readable storage device or storage disk such as a memory, a digital versatile disk (DVD), a compact disk (CD), a Blu-ray disk, etc. including the software and/or firmware. Further still, the example regex engine 100 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example regex engine 100 of FIG. 1 are shown in FIGS. 3-6. The machine readable instructions may be one or more executable program or portion(s) of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 3-6, many other methods of implementing the example regex engine 100 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example process of FIGS. 3-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in that information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 3:
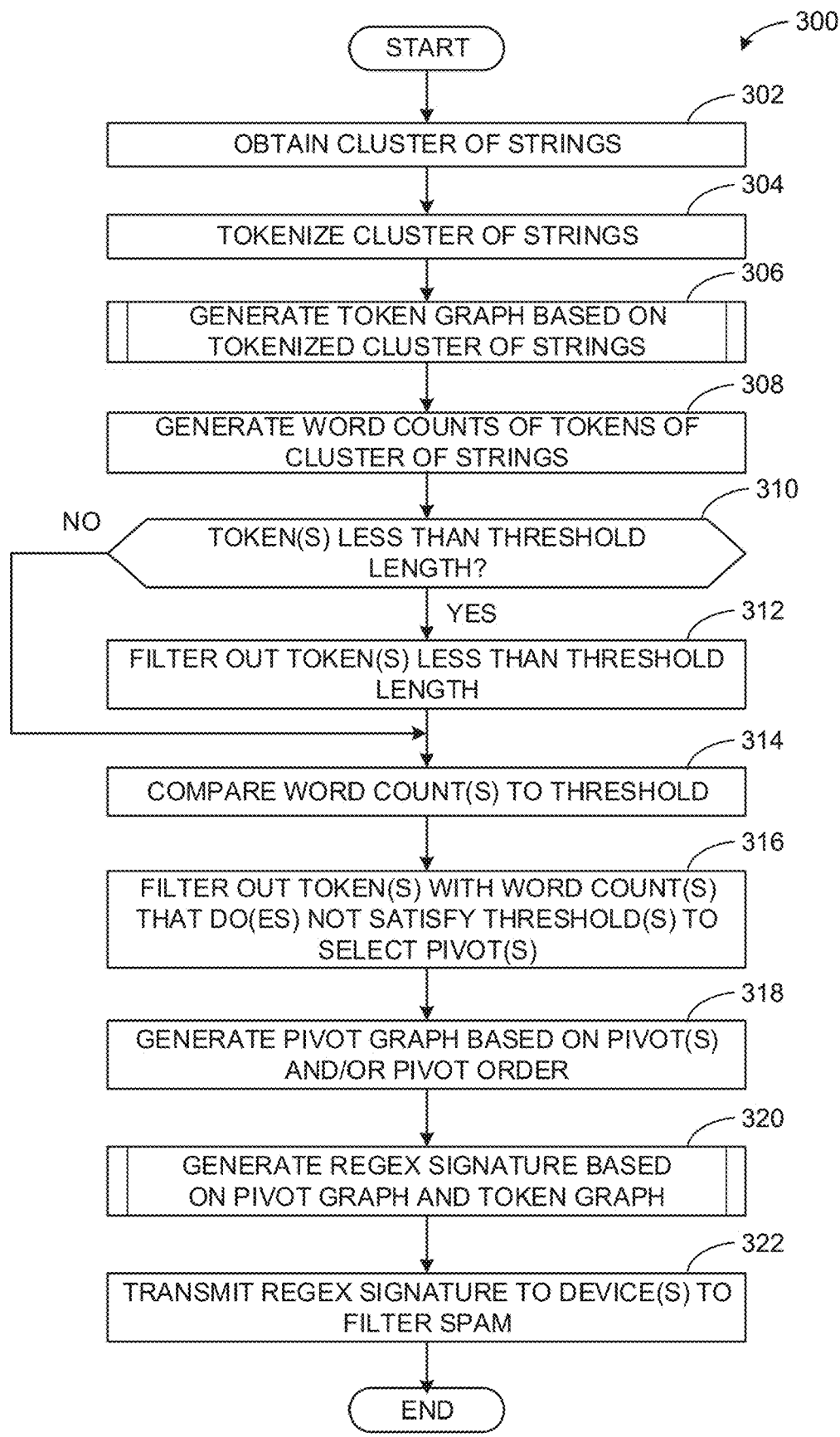
FIGS. 3-6 are flowcharts representative of example machine readable instructions that may be executed to implement the regex engine of FIG. 1.

FIG. 3 is an example flowchart 300 representative of example machine readable instructions that may be executed by the example regex engine 100 of FIG. 1 to generate a regex signature based on a cluster of similar strings. Although the flowchart 300 of FIG. 3 is described in conjunction with the example regex engine 100 of FIG. 1, other type(s) of engine(s), and/or other type(s) of processor(s) may be utilized instead.

At block 302, the example string converter 104 and the example pivot engine 110 obtain a cluster of strings via the example interface 102. The cluster of strings correspond to similar messages (e.g., as identified by another device or component) that have been identified as spam messages. At block 304, the example string converter 104 tokenizes the cluster of strings. For example, the string converter 104 converts the strings of the cluster of strings into tokens (e.g., sub-strings) based on spaces and/or special characters.

At block 306, the example token graph generator 106 generates a token graph (e.g., such as the token graph 204 of FIGS. 2A-2B) based on the tokenized cluster of strings, as further described below in conjunction with FIG. 4. At block 308, the example counter 108 generates word counts of tokens of the cluster of strings corresponding to how many times the tokens occurred in the cluster of strings. For example, the counter 108 counts the number of occurrences of each unique token in the cluster of strings. At block 310, the example filter 114 determines if there is one or more tokens less than a threshold length. If the example filter 114 determines that there is not one or more tokens less than a threshold length (block 310: NO), the process continues to block 314. If the example filter 114 determines that there is one or more tokens less than a threshold length (block 310: YES), the example filter 114 filters out the token(s) less than the threshold length (block 312).

At block 314, the example comparator 112 compares the word counts of the remaining tokens to a threshold (e.g., based on user and/or manufacturer preferences). In some examples, the threshold is a preset number by a user and/or manufacturer. In some examples, the threshold corresponds to the X most common words in the cluster of strings. In some examples, the threshold corresponds to a percentage of strings. In such examples, the comparator 112 may set the threshold based on the number of strings in the string cluster (e.g., if the threshold is set be 80% of the number of strings in the cluster and the cluster includes 200 strings, then the threshold will be set to 160).

At block 316, the example filter 114 filters out token(s) with word count(s) that do(es) not satisfy the threshold (e.g., based on the output of the comparator 112). The remaining tokens after the filtering are the pivot(s). At block 318, the example pivot graph generator 116 generates a pivot graph based on the pivot(s) and/or the order of the pivots based on the cluster of strings. For example, once the pivot(s) are determined, the example pivot graph generator 116 determines the order of the pivots based on the most common order within the cluster of strings. The example pivot graph generator 116 generates the pivot graph to represent the selected pivots and the corresponding order with respect to the cluster of strings.

At block 320, the example regex signature generator 118 generates the regex signature based on the pivot graph and the token graph, as further described below in conjunction with FIG. 5. At block 322 the example deployment interface 124 transmits the generated regex signature to one or more devices to filter spam. For example, the deployment interface 124 may transmit the generated regex signature to one or more devices via a network (e.g., the Internet). As described above, the example deployment interface 124 may transmit the generated regex signature periodically, aperiodically, based on a trigger, alone, and/or as a package of multiple regex signatures. In some examples, the deployment interface 124 stores the generated regex signature temporarily (e.g., in a register) until transmission of the regex signature or a bundle of signatures are triggered. The devices execute the regex signatures to search through messages to tag potential spam messages that are similar to the cluster of strings. The result executing the regex signature results in filtering or otherwise warning the user of potential spam messages.

Figure 4:
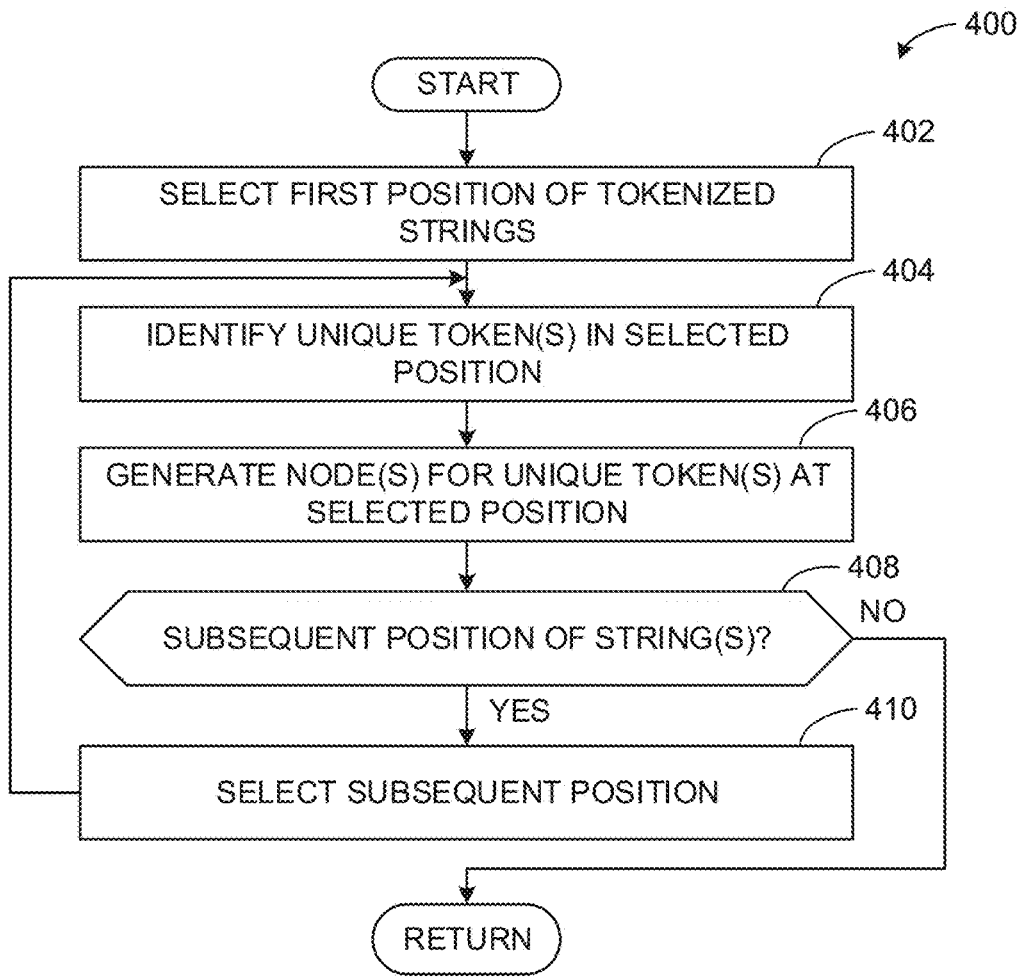

FIG. 4 is an example flowchart 400 representative of example machine readable instructions that may be executed to implement the example regex engine 100 of FIG. 1 to generate a token graph based on the tokenized cluster of strings, as described above in conjunction with block 306 of FIG. 3. Although the flowchart 400 of FIG. 4 is described in conjunction with the example regex engine 100 of FIG. 1, other type(s) of engine(s), and/or other type(s) of processor(s) may be utilized instead.

At block 402, the example token graph generator 106 selects a first position of the tokenized strings. The token graph includes nodes representative of ordered tokens of the string of cluster. Accordingly, the token graph generator 106 selects a first position of the cluster of strings to initiate the token map. At block 404, the example token graph generator 106 identifies the unique token(s) in the selected position. For example, if every tokened string of the cluster of strings begins with wither "Hello" or "Hi," the token graph generator 106 will identify "Hello" and "Hi" as the unique tokens at the first position.

At block 406, the example token graph generator 106 generates one or more nodes for the one or more unique tokens at the selected position. Using the above example, the token graph generator 106 would generate two nodes (e.g., one for "Hello" and one for "Hi") in the first position. At block 408, the example token graph generator 106 determines if there are subsequent token(s) of the tokenized strings in subsequent position(s). If the example token graph generator 106 determines that there are no subsequent tokens in subsequent positions (block 408: NO), the process returns to block 308 of FIG. 3. If the example token graph generator 106 determines that there are subsequent token(s) in subsequent position(s) (block 408: YES), the token graph generator 106 selects the subsequent position of the cluster of strings (block 410) and the process returns to block 404 to generate additional nodes for the token graph at the subsequent position(s).

Figure 5:
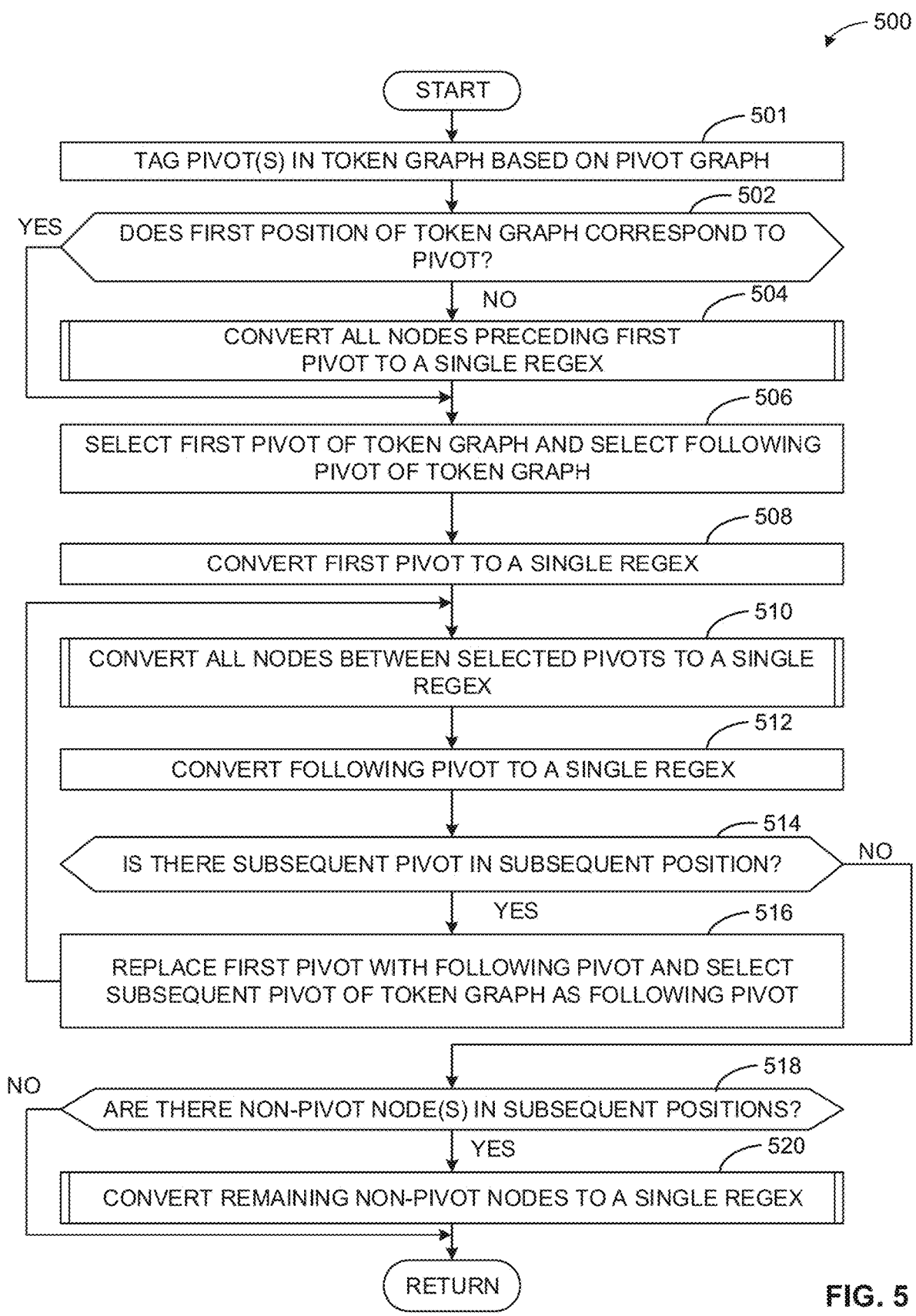

FIG. 5 is an example flowchart 500 representative of example machine readable instructions that may be executed to implement the example regex engine 100 of FIG. 1 to generate a regex signature based on the pivot graph and the token graph, as described above in conjunction with block 320 of FIG. 3. Although the flowchart 500 of FIG. 5 is described in conjunction with the example regex engine 100 of FIG. 1, other type(s) of engine(s), and/or other type(s) of processor(s) may be utilized instead.

At block 501, the example pivot applicator 120 tags node(s) in the token graph as pivot(s) of pivot node(s) based on the pivot and pivot order of the pivot graph. For example, if the pivot graph identifies a first pivot of "A" and a second subsequent pivot of "B," the pivot applicator 120 traverses through the token graph in order until it finds a first "A" node and tags the first "A" node as a pivot node. After the first "A" node is tagged, the pivot applicator 120 continues to traverse the token graph until it finds a first "B" node located after the first "A" node and tags the first "B" node as a pivot node.

At block 502, the example regex converter 122 determines if the first position of the token graph correspond to a pivot node (e.g., the node at the first position has been tagged as a pivot). If the example regex converter 122 determines that the first position of the token graph does correspond to a pivot (e.g., is tagged as a pivot) (block 502: YES), the process continues to block 504. If the example regex converter 122 determines that the first position of the token graph does not correspond to a pivot (block 502: NO), the example regex converter 122 converts the non-pivot nodes preceding the first pivot into a single regex (block 504), as further described below in conjunction with FIG. 6.

At block 506, the example regex converter 122 selects the first pivot of the token graph and selects the following pivot of token graph. At block 508, the example regex converter 122 converts the first pivot into a single regex. when a processor executes a search based on the single regex, the processor look for a word corresponding to the pivot in the position identified in the regex for the pivot. At block 510, the example regex converter 122 converts all the non-pivot nodes between the selected pivots to generate a single regex, in a manner similar to block 504. At block 512, the example regex converter 122 converts the following pivot node to a single regex. At block 514, the example regex converter 122 determines if there is a subsequent pivot in a subsequent position.

If the example regex converter 122 determines that there is a subsequent pivot in a subsequent position (block 514: YES), the example regex converter 122 replaces the first pivot with the following pivot and selects the subsequent pivot of the token graph as the new following pivot (block 516) and the process returns to block 510 to continue to convert subsequent pivot node(s) and/or non-pivot node(s) of the pivot graph to regexes. If the example regex converter 122 determines that there is not a subsequent pivot in a subsequent position (block 514: NO), the example regex converter 122 determines if there are one or more non-pivot nodes in any subsequent positions (block 518) (e.g., any non-pivot after the last pivot of the token graph). If the example regex converter 122 determines that there are not one or more non-pivot nodes in any subsequent positions (block 518: NO), the process returns to block 322 of FIG. 1. If the example regex converter 122 determines that there are one or more non-pivot nodes in any subsequent positions (block 518: YES), the example regex converter 122 converts the remaining non-pivot node to a single regex (block 520), in a manner similar to block 504 and the process returns to block 322 of FIG. 3.

Figure 6:
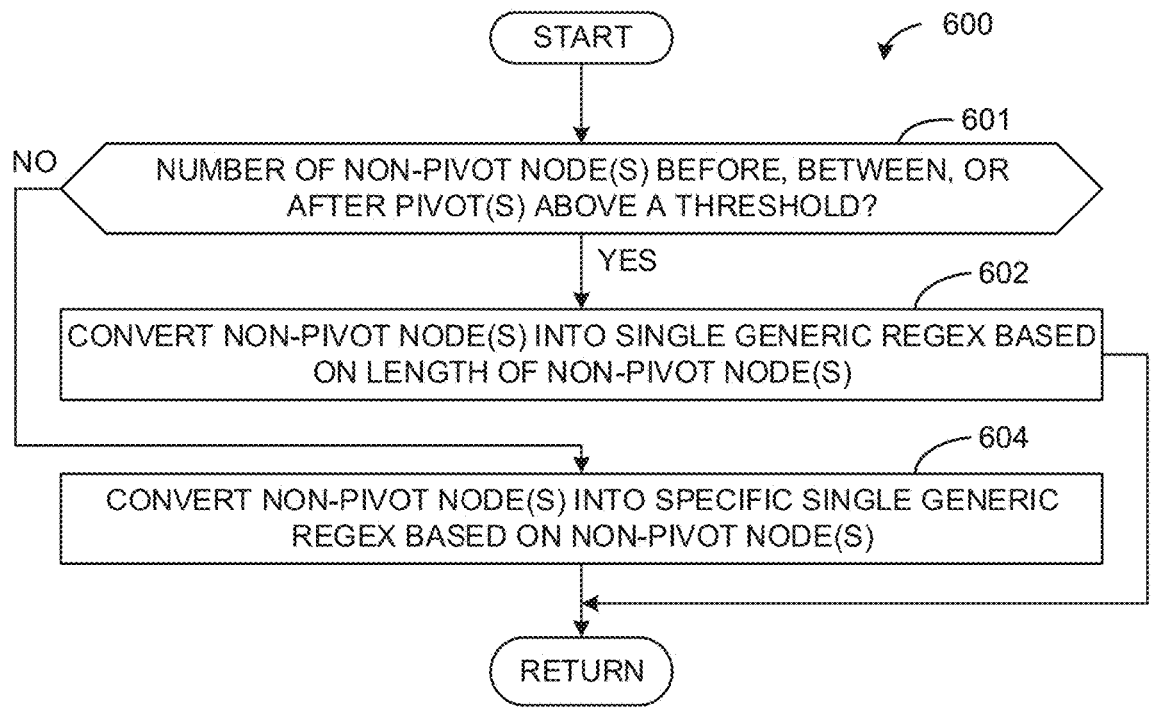

FIG. 6 is an example flowchart 600 representative of example machine readable instructions that may be executed to implement the example regex engine 100 of FIG. 1 to convert non-pivot node(s) between two pivots, non-pivot node(s) before a first pivot, or non-pivot node(s) after a final pivot, as described above in conjunction with blocks 504, 510, and 520 of FIG. 5. Although the flowchart 600 of FIG. 6 is described in conjunction with the example regex engine 100 of FIG. 1, other type(s) of engine(s), and/or other type(s) of processor(s) may be utilized instead.

At block 601, the example regex converter 122 determines if the number of non-pivot nodes(s) before (e.g., corresponding to block 504 of FIG. 5), between (e.g., corresponding to block 510 of FIG. 5), or after the pivot(s) (e.g., corresponding to block 520 of FIG. 5) is above a threshold. As described above in conjunction with FIGS. 2A-2B, the threshold identifies whether the non-pivot node(s) are to be converted into a single generic regex or a single specific regex. The threshold may be based on user and/or manufacturer preferences.

If the example regex converter 122 determines that the number of non-pivot nodes(s) is above the threshold (block 600: YES), the example regex converter 122 converts the non-pivot node(s) into a single generic regex based on the length of the non-pivot node(s) (block 602). For example, if there are two non-pivots, "how" and "why," at the first position, three non-pivots, "is," "are," and "do," at the second position, and one non-pivot, "things" at the third position, the regex converter 122 determines that the length of the strings at the first position is three, the length of the strings at the second position is between 2 and 3, and the length of the string in the third position is 4. Accordingly, the regex converter 122 converts the strings at each position to reflect the character lengths. For example, the regex converter 122 may generate the single generic regex of ({{a-z}{3}} {{a-z}{2-3}} {{a-z}{4}}), where {{a-z}{3}} corresponds to the non-pivots in the first position, {{a-z}{2-3}} corresponds to the non-pivots in the second position, and {{a-z}{4}} corresponds to the non-pivot in the third position. In some examples, the regex converter 122 may add a cushion to expand the search to words that go beyond the character lengths. For example, the regex converter 122 may add a one character cushion to the minimum and maximum lengths of each position based on user and/or manufacturer preferences. Using the above example regex, the regex converter 122 adds a 1 character cushion to the minimum and maximum length of each position corresponding to the regex of ({{a-z}{2-4}} {{a-z}{1-4}} {{a-z}{3-5}}). In this manner, when a processor executes a search based on the above regex, it will pull and/or flag messages that include a word with a 2-4 character length in a first position, a word with a 1-4 character length in a second position, and a word with a 3-4 character length in a third position.

If the example regex converter 122 determines that the number of non-pivot nodes(s) is above the threshold (block 600: NO), the example regex converter 122 converts the non-pivot node(s) into a single specific regex based on the non-pivot node(s) (block 604). For example, if there are two non-pivots (e.g., "A" and "B") in a first position preceding a pivot (e.g., "C") in a second subsequent position of the pivot graph, the regex converter 122 converts the two non-pivots into the single, merged regex {\'A'\'B'}. In this manner, when a processor executes a search based on the above regex, it will pull and/or flag messages that include a "A" followed by "B."

Figure 7:
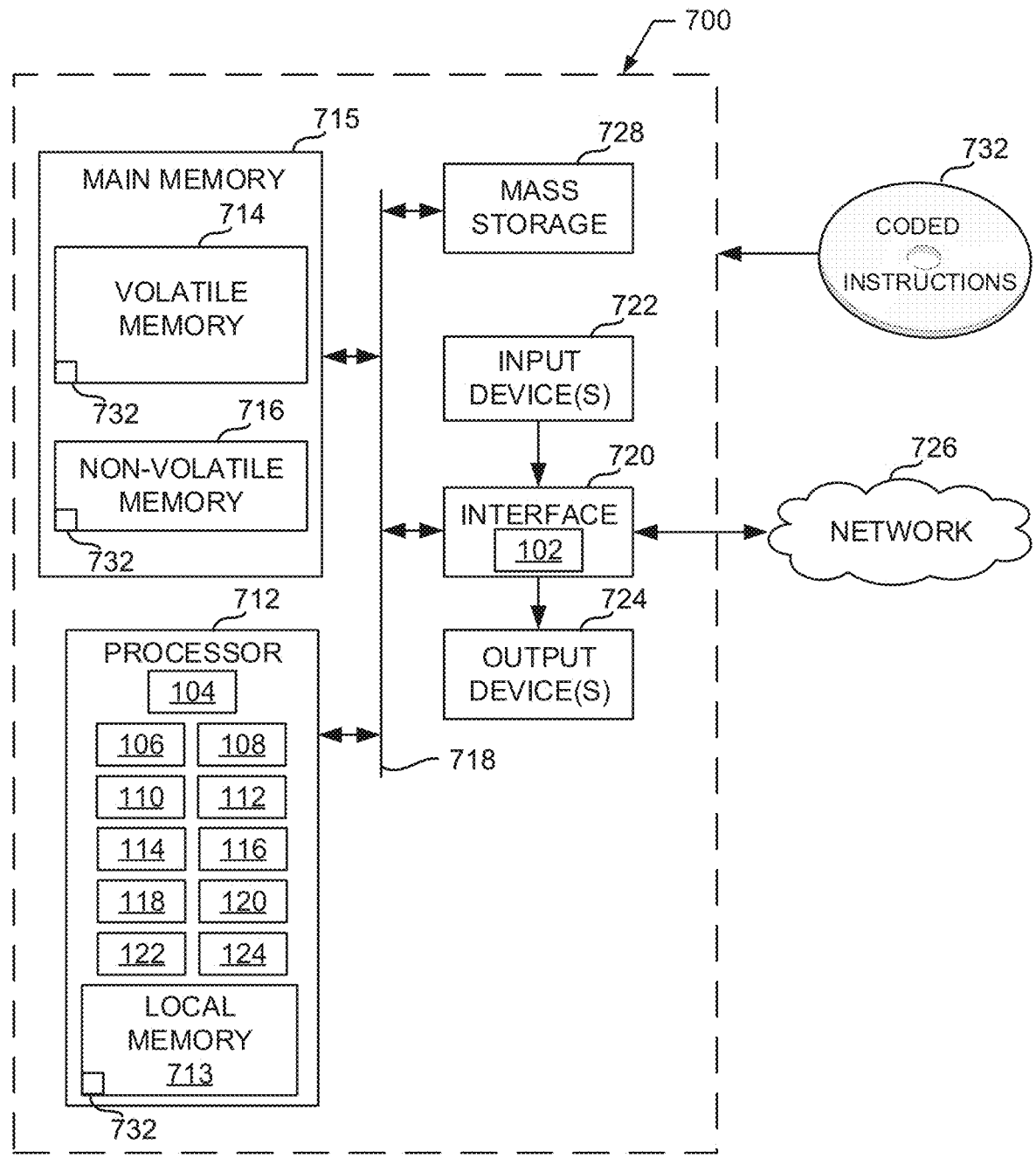
FIG. 7 is a block diagram of an example processor platform structured to execute the instructions of FIGS. 3-6 to implement the example regex engine of FIG. 1.

FIG. 7 is a block diagram of an example processor platform 700 structured to execute the instructions of FIGS. 3-6 to implement the example regex engine 100 of FIG. 1. The processor platform 700 can be, for example, a server, a personal computer, a workstation, a self-learning machine (e.g., a neural network), a mobile device (e.g., a cell phone, a smart phone, a tablet such as an iPad™), or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example interfaced 102, the example string converter 104, the example token graph generator 106, the example counter 108, the example pivot engine 110, the example comparator 112, the example filter 114, the example pivot graph generator 116, the example regex signature generator 118, the example pivot applicator 120, the example regex converter, and the example deployment interface 124.

The processor 712 of the illustrated example includes a local memory 713 (e.g., a cache). The processor 712 of the illustrated example is in communication with a main memory 715 including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 715 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 3-5 may be stored in the one or more mass storage devices 728, in the volatile memory 714, in the non-volatile memory 716, and/or on a removable non-transitory computer readable storage medium such as a CD or DVD.

Example methods, apparatus, systems, and articles of manufacture to generate regex and detect data similarity are disclosed herein. Further examples and combinations thereof include the following: Example 1 includes an apparatus to generate an anti-spam signature, the apparatus comprising a token graph generator to generate a token graph including nodes based on a cluster of strings corresponding to a group of messages that are known to be spam, a pivot engine to identify pivot nodes in the cluster of strings, a pivot applicator to tag corresponding ones of the nodes of the token graph as the pivot nodes, and a regex converter to generate the anti-spam signature based on (a) the tagged nodes and (b) at least one of the node of the token graph that is not tagged as a pivot node.

Example 2 includes the apparatus of example 1, further including a deployment interface to transmit the anti-spam signature to a device via a network to enable the device to identify spam messages based on the anti-spam signature.

Example 3 includes the apparatus of example 1, wherein the nodes of the token graph correspond to substrings of the cluster of strings.

Example 4 includes the apparatus of example 3, wherein positions of nodes of the token graph respectively correspond to positions of respective substrings of the cluster of strings.

Example 5 includes the apparatus of example 1, wherein a first node of the nodes corresponds to first substrings at a first position of the cluster of strings and a second node of the nodes corresponds to second substrings at the first position of the cluster of strings.

Example 6 includes the apparatus of example 1, further including a string converter to convert strings of the cluster of strings into substrings, the token graph generator to generate the token graph based on the substrings, the nodes of the token graph corresponding to the substrings.

Example 7 includes the apparatus of example 3, wherein the substrings are first substrings and further including a filter to filter out second substrings with lengths that do not satisfy a threshold.

Example 8 includes the apparatus of example 1, wherein the regex converter is to generate the anti-spam signature by converting a first tagged node into a first single regular expression, converting a second tagged node into a second single regular expression, and converting multiple untagged nodes between the first tagged node and the second tagged node into a third single regular expression, the anti-spam signature including the first single regular expression, the second single regular expression, and the third single regular expression.

Example 9 includes a non-transitory computer readable storage medium comprising instructions which, when executed, cause a machine to at least generate a token graph including nodes based on a cluster of strings corresponding to a group of messages that are known to be spam, identify pivot nodes in the cluster of strings, tag corresponding ones of the nodes of the token graph as pivot nodes, and generate an anti-spam signature based on (a) the tagged nodes and (b) at least one of the node of the token graph that is not tagged as a pivot node.

Example 10 includes the computer readable storage medium of example 9, wherein the instructions cause the machine to transmit the anti-spam signature to a device via a network to enable the device to identify spam messages based on the anti-spam signature.

Example 11 includes the computer readable storage medium of example 9, wherein the nodes of the token graph correspond to substrings of the cluster of strings.

Example 12 includes the computer readable storage medium of example 11, wherein positions of nodes of the token graph respectively correspond to positions of respective substrings of the cluster of strings.

Example 13 includes the computer readable storage medium of example 9, wherein a first node of the nodes corresponds to first substrings at a first position of the cluster of strings and a second node of the nodes corresponds to second substrings at the first position of the cluster of strings.

Example 14 includes the computer readable storage medium of example 9, wherein the instructions cause the machine to convert strings of the cluster of strings into substrings and generate the token graph based on the substrings, the nodes of the token graph corresponding to the substrings.

Example 15 includes the computer readable storage medium of example 14, wherein the substrings are first substrings, wherein the instructions cause the machine to filter out second substrings with lengths that do not satisfy a threshold.

Example 16 includes the computer readable storage medium of example 9, wherein the instructions cause the machine to generate the anti-spam signature by converting a first tagged node into a first single regular expression, converting a second tagged node into a second single regular expression, and converting multiple untagged nodes between the first tagged node and the second tagged node into a third single regular expression, the anti-spam signature including the first single regular expression, the second single regular expression, and the third single regular expression.

Example 17 includes a method to generate an anti-spam signature, the method comprising generating, by executing an instruction with a processor, a token graph including nodes based on a cluster of strings corresponding to a group of messages that are known to be spam, identifying, by executing an instruction with the processor, pivot nodes in the cluster of strings, tagging, by executing an instruction with the processor, corresponding ones of the nodes of the token graph as the pivot nodes, and generating, by executing an instruction with the processor, the anti-spam signature based on (a) the tagged nodes and (b) at least one of the nodes of the token graph that is not tagged as a pivot node.

Example 18 includes the method of example 17, further including transmitting the anti-spam signature to a device via a network to enable the device to identify spam messages based on the anti-spam signature.

Example 19 includes the method of example 17, wherein the nodes of the token graph correspond to substrings of the cluster of strings.

Example 20 includes the method of example 19, wherein a positions of nodes of the token graph respectively correspond to positions of respective substrings of the cluster of strings.

Example 21 includes the method of example 17, wherein a first node of the nodes corresponds to first substrings at a first position of the cluster of strings and a second node of the nodes corresponds to second substrings at the first position of the cluster of strings.

Example 22 includes the method of example 17, further including converting strings of the cluster of strings into substrings, the generating of the token graph based on the substrings, the nodes of the token graph corresponding to the substrings.

Example 23 includes the method of example 22, wherein the substrings are first substrings, and further including filtering out second substrings with lengths that do not satisfy a threshold.

Example 24 includes the method of example 17, wherein the generating of the anti-spam signature includes converting a first tagged node into a first single regular expression, converting a second tagged node into a second single regular expression, and converting multiple untagged nodes between the first tagged node and the second tagged node into a third single regular expression, the anti-spam signature including the first single regular expression, the second single regular expression, and the third single regular expression.

From the foregoing, it will be appreciated that example methods, apparatus and articles of manufacture have been disclosed herein to generate regex and detect data similarity. Disclosed methods, apparatus and articles of manufacture generate a token graph representative of different combinations of ordered sub-strings of the group of messages. Additionally, examples disclosed herein identify pivots or pivot nodes of the token graph from group of messages (e.g., messages grouped based on similarity of subject, points of origin, destination, characteristics of the recipient, text, number of characters, links, tags, length of text, etc.). Examples disclosed herein generate an anti-spam signature based on the token graph and identified pivots. For example, individual pivots of the token graph are converted into single regex expressions and multiple non-pivots (e.g., substrings that do not occur more than the threshold number of times in the group of messages) between two pivots are represented by into single, merged regex expression. Accordingly, the anti-spam signature include the regular expressions for pivots representative of the most common substrings of the group of messages and regular expressions for the random context surrounding the pivots (e.g., the non-pivots), representing 90% or more of the group of messages. Using examples disclosed herein, an accurate anti-spam signature can be automatically generated based on thousands of strings within seconds. Filtering out spam messages can solve network traffic and eliminate potential vehicles for transferring malware that can damage, misuse, or even destroy a computing device. Disclosed methods, apparatus and articles of manufacture are accordingly directed to one or more improvement(s) in the functioning of a computer by creating signature(s) that help device(s) automatically identify and tag spam.

It is noted that this patent claims priority from Indian Patent Application Serial Number 201911019039, which was filed on May 13, 2019, and is hereby incorporated by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to generate an anti-spam signature, the apparatus comprising:
   interface circuitry to obtain a group of spam messages;
   string converter instructions to convert strings from the group of spam messages into sub strings that correspond to words included in the spam messages;
   token graph generator instructions to cause generation of a token graph based on the substrings;
   pivot engine instructions to cause identification of pivot nodes in the token graph based on a cluster of strings corresponding to the group of spam messages, the token graph including the pivot nodes corresponding to a first portion of the substrings and non-pivot nodes corresponding to a second portion of the substrings, the pivot nodes corresponding to first words that occur more than a threshold number of times in the group of spam messages, the threshold being a user-defined value;
   pivot applicator instructions to cause tagging of corresponding ones of the nodes of the token graph as the pivot nodes; and regex converter instructions to
cause generation of the anti-spam signature using: (a) substrings represented by the tagged nodes and (b) at least one substring represented by a non-pivot node of the token graph.

2. The apparatus of claim 1, further including deployment interface circuitry to transmit the anti-spam signature to a device via a network to enable the device to identify spam messages based on the anti-spam signature.

3. The apparatus of claim 1, wherein the substrings are first substrings, the nodes of the token graph correspond to the first substrings of the cluster of strings, positions of the nodes of the token graph respectively correspond to positions of respective substrings of the cluster of strings, further including a filter to filter out second substrings with lengths that do not satisfy a threshold.

4. The apparatus of claim 1, wherein a first node of the nodes corresponds to first substrings at a first position of the cluster of strings and a second node of the nodes corresponds to second substrings at the first position of the cluster of strings.

5. The apparatus of claim 1, wherein the regex converter instructions are to generate the anti-spam signature by:
converting a first tagged node into a first single regular expression;
converting a second tagged node into a second single regular expression; and
converting multiple untagged nodes between the first tagged node and the second tagged node into a third single regular expression, the anti-spam signature including the first single regular expression, the second single regular expression, and the third single regular expression.

6. The apparatus of claim 1, wherein the string converter instructions are to convert the strings into substrings based on a space character.

7. The apparatus of claim 1, wherein the non-pivot nodes correspond to second words that occur less than a second threshold number of times in the group of spam messages.

8. The apparatus of claim 1, wherein the regex converter instructions are to:
determine a length of the non-pivot nodes at a first location of the spam messages; and
determine a user-defined cushion value, the anti-spam signature corresponding to a sum of the length and the user-defined cushion value.

9. A non-transitory computer readable storage medium comprising instructions to cause a programmable circuitry to at least:
generate a token graph based on a cluster of strings corresponding to a group of messages that are known to be spam, the token graph including non-pivot nodes;
identify first nodes of the token graph as pivot nodes corresponding to words that occur more than a threshold number of times in the group of messages, the threshold based on a number of strings in the cluster of strings;
tag corresponding ones of the nodes of the token graph as the pivot nodes; and
generate an anti-spam signature using: (a) substrings corresponding to the tagged nodes and (b) at least one substring corresponding to a non-pivot node of the non-pivot nodes, the anti-spam signature including a regular expression corresponding to non-pivot nodes at a location of the cluster of strings.

10. The computer readable storage medium of claim 9, wherein the instructions cause the programmable circuitry to transmit the anti-spam signature to a device via a network to enable the device to identify spam messages based on the anti-spam signature.

11. The computer readable storage medium of claim 9, wherein the nodes of the token graph correspond to substrings of the cluster of strings, positions of nodes of the token graph respectively correspond to positions of respective substrings of the cluster of strings.

12. The computer readable storage medium of claim 9, wherein a first node of the nodes corresponds to first substrings at a first position of the cluster of strings and a second node of the nodes corresponds to second substrings at the first position of the cluster of strings.

13. The computer readable storage medium of claim 9, wherein the substrings are first substrings, the instructions to cause the programmable circuitry to:
convert strings of the cluster of strings into the first sub strings and generate the token graph based on the first substrings, the nodes of the token graph corresponding to the first substrings; and
filter out second substrings with lengths that do not satisfy a threshold.

14. The computer readable storage medium of claim 9, wherein the instructions cause the machine programmable circuitry to generate the anti-spam signature by:
converting a first tagged node at a first location into a first single regular expression;
converting a second tagged node at a second location into a second single regular expression;
converting first multiple untagged nodes at a third location between the first location and the second location into a third single regular expression; and
converting second multiple untagged nodes at a fourth location between the first location and the second location into a fourth single regular expression, the anti-spam signature including the first single regular expression at the first location, the second single regular expression at the second location, the fourth single regular expression between the first location and the second location, and the third single regular expression between the first location and the second location.

15. The computer readable storage medium of claim 9, wherein:
the non-pivot nodes corresponding to words that occur less than the threshold number of times in the group of messages; and
the regular expression corresponding to substrings which are a user-defined length longer than lengths of the non-pivot nodes at the location.

16. A method to generate an anti-spam signature, the method comprising:
generating, by executing an instruction with programmable circuitry, a token graph based on a cluster of strings corresponding to a group of messages that are known to be spam;
identifying, by executing an instruction with the programmable circuitry, first nodes of the token graph as pivot nodes based on words that occur more than a threshold number of times in the group of messages, the threshold based on a number of sub strings in the cluster of strings;
tagging, by executing an instruction with the programmable circuitry, corresponding ones of the nodes of the token graph as the pivot nodes; and
generating, by executing an instruction with the programmable circuitry, the anti-spam signature using: (a) substrings corresponding to the tagged nodes and (b) at least one substring corresponding to a non-pivot node.

17. The method of claim 16, further including transmitting the anti-spam signature to a device via a network to enable the device to identify spam messages based on the anti-spam signature.

18. The method of claim 16, wherein the token graph including the pivot nodes and non-pivot nodes, the non-pivot nodes corresponding to second words that occur less than a second threshold number of times in the group of messages.

19. The method of claim 16, wherein the anti-spam signature including a regular expression corresponding to (a) substrings which are a first user-defined length longer than lengths of the non-pivot nodes at a location and (b) substrings which are a second user-defined length shorter than the lengths of the non-pivot nodes at the location.

20. An apparatus to generate an anti-spam signature, the apparatus comprising:
   memory;
   instructions; and
   programmable circuitry to execute the instructions to:
      generate a token graph, the token graph based on a cluster of strings corresponding to a group of spam messages;
      tag corresponding nodes of the token graph as pivot nodes based on words that occur more than a user-defined first threshold number of times in the group of messages, the token graph including non-pivot nodes, the non-pivot nodes corresponding to words that occur less than a user-defined second threshold number of times in the group of spam messages; and
      generate the anti-spam signature using: (a) substrings corresponding to the tagged nodes and (b) at least one substring corresponding to at least one of the non-pivot nodes, the anti-spam signature including a regular expression corresponding to the at least one of the non-pivot nodes.

21. The apparatus of claim 20, wherein the programmable circuitry is to cause transmission of the anti-spam signature to a device via a network to enable the device to identify spam messages based on the anti-spam signature.

22. The apparatus of claim 20, wherein the nodes of the token graph correspond to substrings of the cluster of strings, positions of the nodes of the token graph respectively correspond to positions of respective substrings of the cluster of strings.

23. The apparatus of claim 20, wherein a first node of the nodes corresponds to a first substring at a first position of the cluster of strings and a second node of the nodes corresponds to a second substring at the first position of the cluster of strings.

24. The apparatus of claim 20, wherein the substrings are first substrings, the programmable circuitry to:
   convert strings of the cluster of strings into the first substrings and generate the token graph based on the first substrings, the nodes of the token graph corresponding to the first substrings; and
   filter out second substrings with lengths that do not satisfy a threshold.

25. The apparatus of claim 20, wherein the programmable circuitry is to generate the anti-spam signature by:
   converting a first tagged node into a first single regular expression;
   converting a second tagged node into a second single regular expression; and
   converting multiple untagged nodes between the first tagged node and the second tagged node into a third single regular expression, the anti-spam signature including the first single regular expression, the second single regular expression, and the third single regular expression.

26. The apparatus of claim 20, wherein the regular expression corresponding to substrings which are a user-defined length shorter than lengths of the at least one of the non-pivot nodes.

* * * * *